United States Patent
Rupard (12) 
(10) Patent No.: US 6,193,259 B1
(45) Date of Patent: Feb. 27, 2001

(54) MOUNTING FRAME FOR USE WITH THREE POINT HITCH

(76) Inventor: Clarence B. Rupard, 135 Rupard Trail, Mocksville, NC (US) 27028

( * ) Notice: Subject to any disclaimer, the term of this patent is extended or adjusted under 35 U.S.C. 154(b) by 0 days.

(21) Appl. No.: 09/239,176

(22) Filed: Jan. 28, 1999

(51) Int. Cl.⁷ ................................................ A01B 59/043
(52) U.S. Cl. .................... 280/508; 280/510; 280/477; 172/275; 172/439
(58) Field of Search ...................... 172/275, 439, 172/47; 280/477, 497, 498, 504, 508, 509, 510, 511, 512, 513, 514

(56) References Cited

U.S. PATENT DOCUMENTS

| | | |
|---|---|---|
| 2,078,851 * | 4/1937 | Hovey . |
| 2,482,868 | 9/1949 | Pollard . |
| 3,266,817 | 8/1966 | Engstrom . |
| 3,347,564 | 10/1967 | Snoozy . |
| 3,421,779 | 1/1969 | Shelby . |
| 3,542,399 | 11/1970 | Myers . |
| 3,801,133 * | 4/1974 | Thompson ........................... 280/446 |
| 3,941,407 | 3/1976 | Breford . |
| 4,340,240 | 7/1982 | Anderson . |
| 4,343,484 | 8/1982 | Van Antwerp . |
| 4,360,217 | 11/1982 | Pittman . |
| 4,502,706 | 3/1985 | Frambach, Sr. . |
| 4,657,276 * | 4/1987 | Hamerl ................................. 280/512 |
| 4,738,461 | 4/1988 | Stephenson . |
| 4,802,686 | 2/1989 | Isreal . |
| 5,029,650 * | 7/1991 | Smit ......................................... 172/5 |
| 5,346,018 * | 9/1994 | Koster .................................... 172/47 |
| 5,730,227 | 3/1998 | Hund . |
| 5,950,735 * | 9/1999 | Godbersen .......................... 172/439 |
| 5,984,019 * | 11/1999 | Hund ................................... 172/439 |

* cited by examiner

*Primary Examiner*—Brian L. Johnson
*Assistant Examiner*—Avraham H. Lerner
(74) *Attorney, Agent, or Firm*—Robert W. Pitts (57) ABSTRACT

A mounting frame 10 is intended to be used with a three point hitch apparatus 4 on the rear of powered vehicle, such as a tractor. The frame 10 is rectangular so that the center is open to permit clearance for a power take off. A ball socket 20 is mounted on a horizontal lower frame beam 12 for attachment of a towed vehicle to the powered vehicle. The top of the frame 10 is attached to the tractor by a telescoping arm 60 that can be extended from a retracted to an extended position so that the frame 10 can be tilted or dumping or similar operations. A ball adaptor 34 can be mounted in the center of the mounting frame 10 to permit attachment of a towed implement or vehicle with a male attachment member, such as a ball. A center beam 78 can also be mounted on the center of the mounting frame 10 for supporting and carrying loads. The mounting frame 10 facilitates towing, hauling, dumping, scraping and is compatible with a power takeoff as used for conventional farm implements.

25 Claims, 9 Drawing Sheets

MOUNTING FRAME FOR USE WITH THREE POINT HITCH

BACKGROUND OF THE INVENTION

1. Field of the Invention

A mounting frame according to this invention is intended to be mounted on the rear of a powered vehicle to attach a towed vehicle or implement or accessory equipment to the powered vehicle. This mounting frame is of the type that is particularly useful when mounted on a standard three point hitch that is commonly employed on a tractor, although the frame could be mounted on other vehicles.

2. Description of the Prior Art

One approach to attaching a towed vehicle to a tractor is to use a drawbar extending from the rear of the tractor. When the drawbar is located at a fixed height, the towed vehicle must be jacked to the appropriate height to attach the implement hitch to the drawbar. This requires the operator to both adjust the towed vehicle and move the tractor, increasing the time and energy spent on this rather rudimentary procedure.

Other tractors employ a conventional three-point hitch in which two draft links are pivoted relative to a tractor chassis. Each of these two draft links is attached to a lift link which is in turn attached to a hydraulically actuated rockshaft to move the draft links up and down. A center link is located above the two lower links and is attached to the towed vehicle. After the implement is attached to the three point hitch, the implement or towed vehicle can be raised or lowered by actuating the tractor rockshaft. An additional component that can be used with a conventional three point hitch is a hitch bar that can be mounted between the two lower links and would include a number of hitching means along its length so that different implements or devices can be attached to the tractor.

Another prior approach is shown in U.S. Pat. No. 5,730,227 which includes a five sided frame for attachment to a three point hitch. This frame is intended to facilitate turning when a power take off is used. The attachment point for this frame is closer to the tractor than the ends of the draft links so that the frame does not interfere with a power take off during turns.

SUMMARY OF THE INVENTION

Prior art devices do not provide means for simplifying the attachment of an implement to a tractor. An improved mounting frame that would allow an operator to attach a variety of implements and towed vehicles to the tractor without having to dismount the tractor is needed so that the time to attach a tractor to a device is reduced. Furthermore this improved hitching apparatus should be of the type that can be used by one person, requiring no additional help. A simple hitching apparatus should allow an operator to merely back the tractor into engagement with the towed device and should require only vertical movement of the mounting frame in order to securely attached the implement to the tractor.

The improved mounting device should also provide means for attaching various adaptors and accessory devices to the tractor. For example, the mounting frame should be easily adaptable by a single person to employ either a male or female attachment member, so that the mounting frame could be used with towed devices having attachment devices of either gender. The mounting frame should also provide means for attaching accessory equipment to the frame to perform such tasks as grading, hauling and dumping, transporting round hay bails without the need for a towed vehicle. All of these devices should be interchangable and should require only simple attachment operations that could be easily performed by one person. Furthermore the mounting frame should not obstruct the power takeoff employed with standard towed implements, such as combines or other equipment.

The mounting frame according to the preferred embodiment of this invention accomplishes these and other objectives, and the simple mounting frame can be attached to a three point hitch on a tractor.

An implement attachment apparatus, according to this invention, is for use with a three point hitch on a powered vehicle, such as a tractor, includes a frame attachable to the three point hitch. The frame can be shifted by the three point hitch, and the frame includes a horizontal bar attachable at opposite ends to the three point hitch, and a central attachment point located above the horizontal bar. An implement attachment socket, such as a ball socket is located on the horizontal bar and below the central attachment point. The frame is movable vertically in response to movement of the three point hitch so that the implement attachment socket can be positioned beneath an attachment member on a towed implement.

This implement attachment apparatus can be used to selectively attach wheeled and nonwheeled implements to a powered vehicle in order to transport the implements or to selectively attach implements directly to the three point hitch. The frame includes a lower beam and an upper beam, substantially parallel to the lower beam. Left and right upright supports extend between the upper and lower beams. The left and right upright supports, or side rails, are spaced apart so that the frame is open between the upper and lower beams. A pivoting attachment member is attached to the upper beam. Left and right pivoting attachment points are located adjacent ends of the lower beam so that the frame can be pivoted relative to the powered vehicle for performing work and for attaching or detaching an implement to the powered vehicle.

This mounting apparatus is especially useful for selectively attaching a plurality of farm implements to a tractor. The apparatus frame is attachable to bottom links of a three point hitch on the tractor and a telescoping arm comprises the central link of the three point hitch. The telescoping arm is attachable to the center of the frame above and between the bottom links. The frame includes an implement attachment socket on the bottom of the frame. The height of the frame is altered by movement of the three point hitch, and the frame is tilted upon extension of the telescoping arm in the absence of any other movement of the three point hitch.

This apparatus for selectively attaching implements to a tractor at three points comprises a peripheral frame, a telescoping arm and an implement attachment member. The peripheral frame includes hinge pins for attaching the frame to the tractor adjacent opposite ends of the base of the frame and at the center of the top of the frame. The peripheral frame is open in the center to provide clearance for a power takeoff from the tractor. The telescoping arm extends between the center of the top of the frame and the tractor. The telescoping arm includes telescoping members that are releasable to permit the frame to tilt upon release of one telescoping member relative to the other telescoping member. The implement attachment member, such as a ball socket, is located on the base of the frame for attaching an implement to the frame.

DETAILED DESCRIPTION OF THE PREFERRED EMBODIMENTS

The implement attachment apparatus 2 comprising the first embodiment of this invention is primarily intended for use of a tractor or other powered vehicle having a three point hitch. Trailers, combines, buckets, graders, and other farm implements can be mounted on this mounting frame 10. The implement attachment apparatus 2, comprising a mounting frame 10, is attached at three points to the tractor or other vehicle. Right and left bottom links 6A and 6B on the three point hitch are attached to the sides of the mounting frame 10 adjacent to the bottom of the frame. A third attachment is located at the top center of the mounting frame or yoke 10.

The mounting frame 10 comprises a rectangular member with an open center to provide access for a power takeoff from the tractor as well as space for mounting other components or implements. The frame 10 includes a horizontal lower beam or bar 12, a horizontal top bar or beam 14, a left side rail or upright support 16 and a right side rail or upright support 18. In the preferred embodiment, the top beam 14 and the side rails 16, 18 comprise a U-shaped member formed from one member having a rectangular cross section. The end of the side rails 16, 18 are welded to the bottom beam 10 adjacent to the ends.

Figure 4:
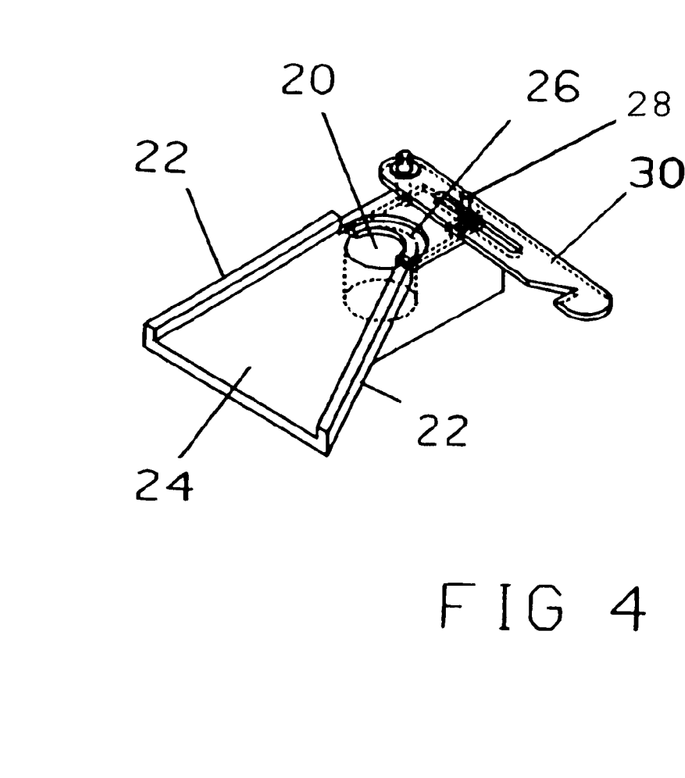
FIG. 4 is a view of the ball socket located on the bottom of the mounting frame and providing means for attaching an implement, such as a farm implement, to the tractor or other vehicle on which the mounting frame is employed.
Figure 5:
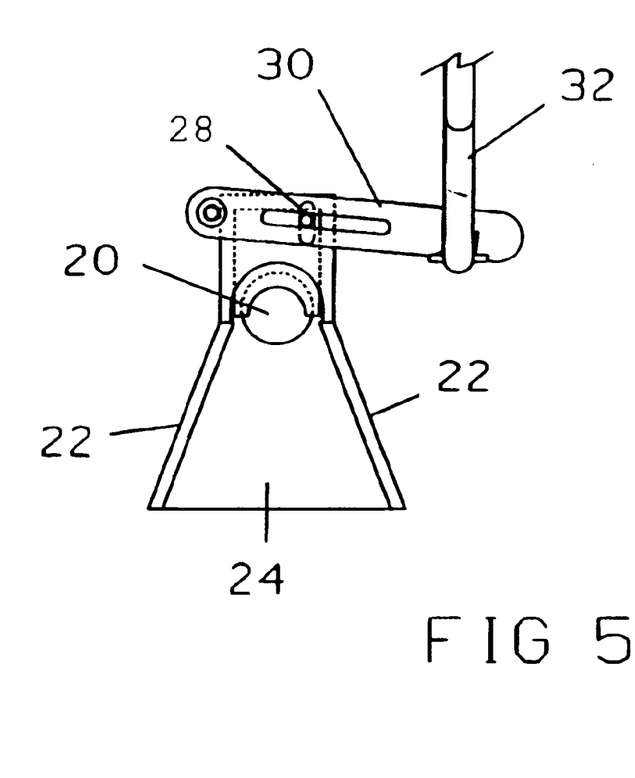
FIG. 5 is a rear view of the ball socket shown in FIG. 4.

A ball socket 20 is mounted at the center of the lower beam 10 to provide a means for connecting an implement, such as a trailer or combine to the mounting frame 10. Ball socket 20 comprises a female member dimensioned to receive a standard hitching ball mounted on the implement, or towed vehicle, to be attached to the tractor or powered vehicle. A pair of guide rails 22 converge on the ball socket 20 and provide means for guiding a ball into the ball socket 20 as the tractor is backed up for connection to the implement. A sloping or ramp surface 24 extends from the rear of the mounting frame toward the ball socket 20 so that a ball will ride up the sloping surface 24 and then can drop into the ball socket 20 after being aligned by the converging guide rails 22. In the preferred embodiment, the guide rails 22 protrude above the sloping surface 24.

The ball socket subassembly also includes a fork 26 having a substantially U-shaped ball engaging section. The width of the U-shaped ball engaging section is less than the outer diameter of the ball that is to be captured in the ball socket 20 by the fork 26. The fork 26 moves between a retracted and an extended position. In the retracted position, the ball socket 20 is unobstructed by the fork 26 so that a ball on an implement or other connecting ball can drop into the ball socket 20 after relative movement between the implement and the mounting frame 10. After the ball has entered the ball socket 10, the fork 26 can be shifted to the extended position resulting from reward movement of the fork 26. In the extended position, the fork 26 will extend over the top of the ball and will surround the neck on which a ball is mounted. The fork 26 will therefore trap the ball in the ball socket 20 preventing upward movement of the ball relative to the ball socket 20.

The fork 26 travels in a slot in the ball socket subassembly and is spring loaded relative to the remainder of the ball socket subassembly. Spring 28 extends between the lower horizontal beam 12 and a cross bar 30 that is pivotally attached to the fork 26 at one end of the cross bar 30 by a hinge pin in a conventional manner. The spring 28 is attached between opposite ends of the cross bar 30. An actuator shaft 32 is hinged to the lower horizontal beam 12 and extends upwardly. The shaft 32 engages the opposite end of the cross bar 30 so that the spring 28 extends between the actuator shaft 32 and the end of the cross bar 30 hinged to the ball socket subassembly. Rotation of the actuator shaft 32 brings the shaft into engagement with the cross bar 30 which in turn caused the fork 26 to move from the extended position, where it is normally held by the spring 28, to the retracted position exposing the ball socket 20 so that a ball can be inserted or removed from the ball socket 20. The length of the actuator shaft 32 is sufficient for an operator sitting on the seat of a tractor to grasp the shaft 32 an retract the fork 26. In the preferred embodiment, the shaft 32 is angled to both clear other portions of the mounting frame 10 and to move the end of the shaft forward where it can be easily grasped by the operator. Of course numerous other equivalent means may be employed for retraction of the fork 26. A remotely controlled servo motor could be employed or the fork could be hydraulically retracted.

Figure 1:
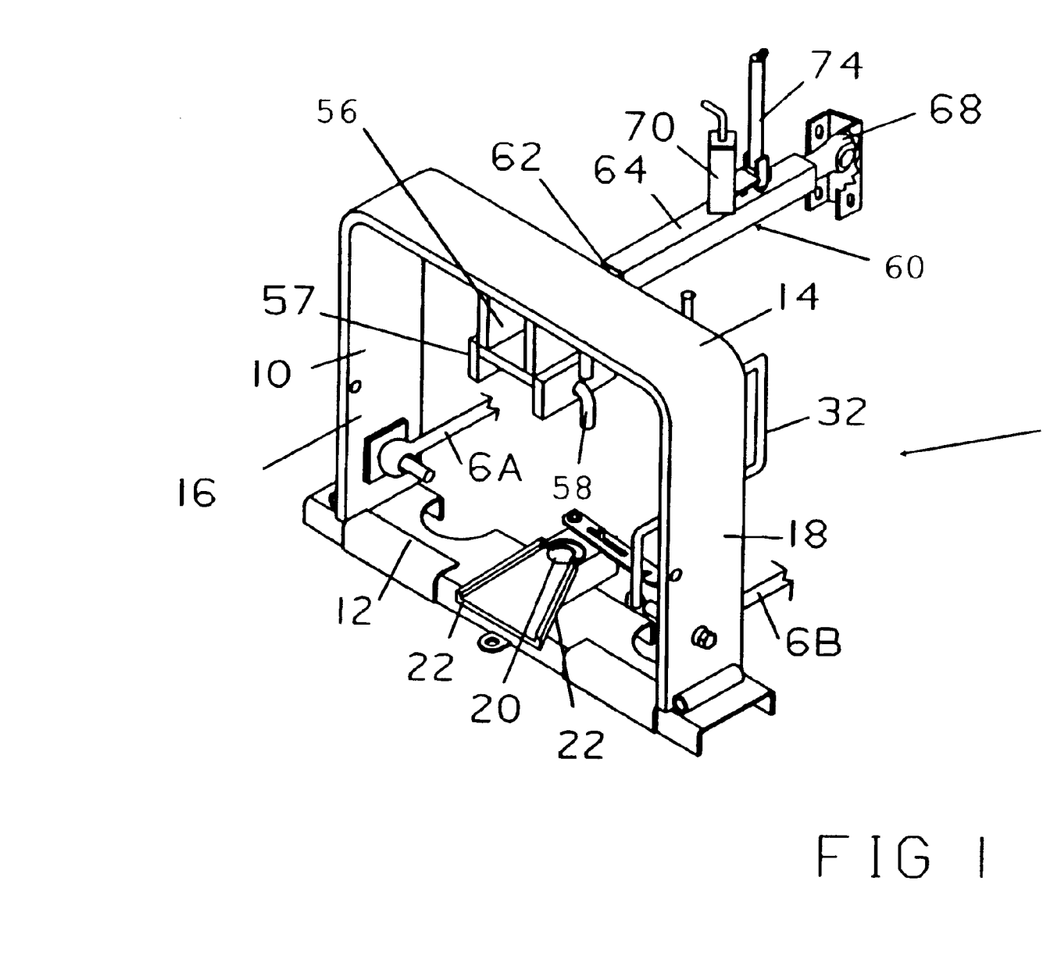
FIG. 1 is a view of one embodiment of a mounting frame that can be attached to a three point hitch that can be attached to the rear of a vehicle, such as a tractor.

In the embodiment of FIG. 1, the height of the ball socket subassembly is small enough to prevent the ball socket subassembly from interfering with an implement shaft extending through the rectangular opening on the mounting frame 10 for attachment to a conventional power take off on a tractor or other powered vehicle. Of course clearance between the power take off shaft and the implement attachment means must also be provided. Since the frame 10 is mounted on a three point hitch, the entire frame 10 can be moved vertically to permit a powered implement to be attached using this mounting frame 10.

In addition to being attached to the two bottom links 6A and 6B of a three point hitch on a tractor, the mounting frame 10 is also attached at the top. A rectangular top link attachment bracket 56 extends downward from the top beam 14 at the center of this beam. In the embodiment of FIG. 1 this bracket 56 is welded to the bottom of the continuous beam 14, but other equivalent structures could also be employed to form this bracket. For example, an alternate version of this bracket 56 could comprise two parallel flanges extending above or below the top beam 14. Opposite walls of the rectangular bracket 56 have holes through which a pin 58 can be inserted to attach a telescoping arm 60 extending from the tractor to the mounting frame 10 and comprising the top link of a three point hitch arrangement. The rectangular bracket 56 also includes two flange plates 57 extending toward the center of the mounting frame with holes for receiving another attachment pin 58.

Figure 3:
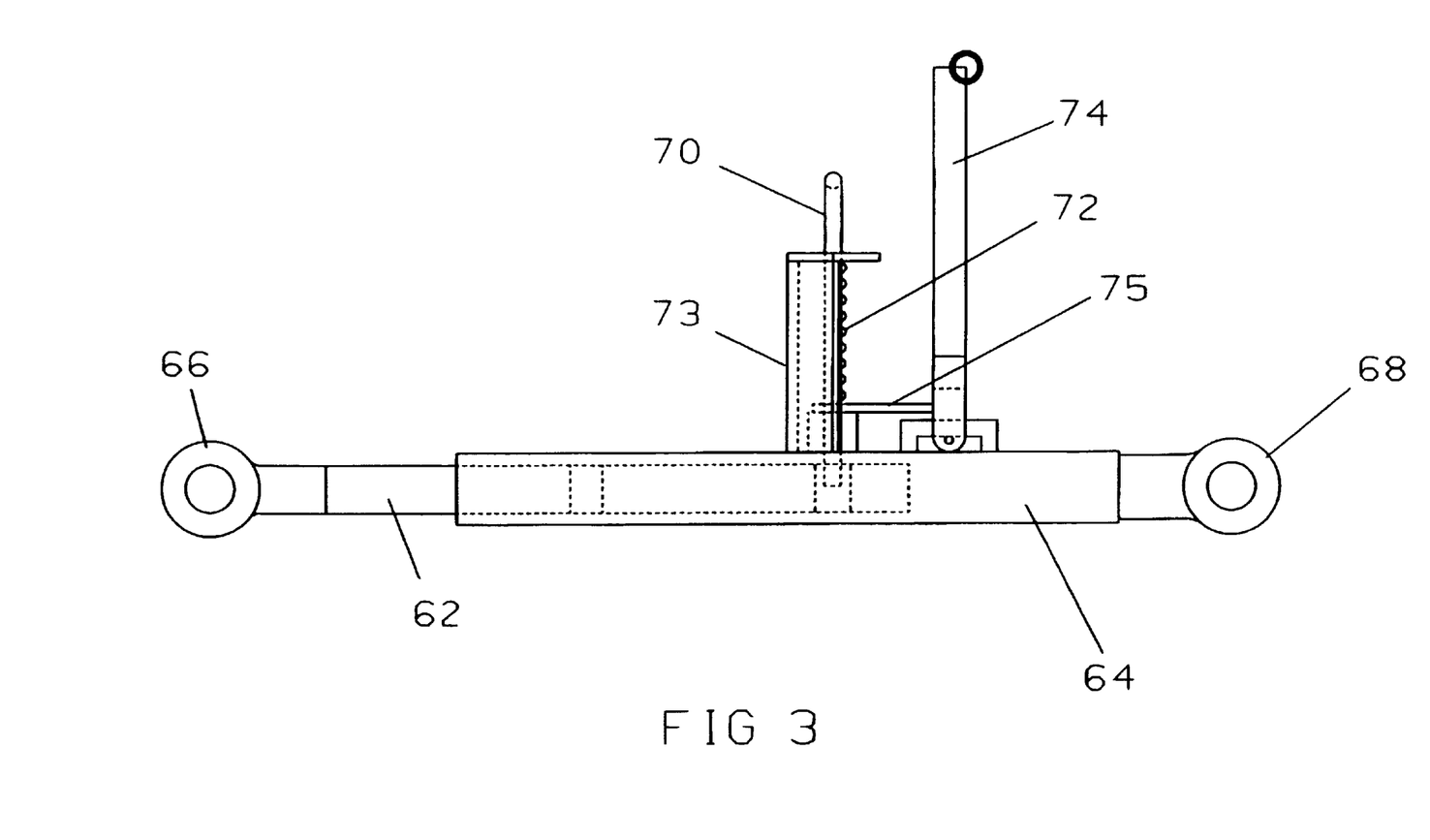
FIG. 3 is a view of a telescoping arm that attaches the top of the mounting frame to a tractor.

The telescoping arm 60 which forms the top attachment member of the three point hitch comprises a first or inner telescoping member 62 received within a second outer telescoping member 64. The inner telescoping member 62 is located at the rear of the telescoping arm 60 adjacent to the mounting frame 10. The outer telescoping member 64 is located on the front of the telescoping arm 60. The relative positions of the inner telescoping member 62 and the outer telescoping member 62 can be reversed if desired. In the embodiment depicted herein, each telescoping member 62, 64 is formed of tubing having a rectangular or square cross section with the inner telescoping member 62 of course being smaller so that it can be received within the outer telescoping member 64. Both of the two telescoping member include eyelets 66, 68 so that they can be attached respectively to the mounting frame 10 and to the tractor. Pins can be inserted through each eyelet so that the telescoping arm 60 can rotate relative to both the mounting frame 10 and to the tractor chassis.

Figure 2:
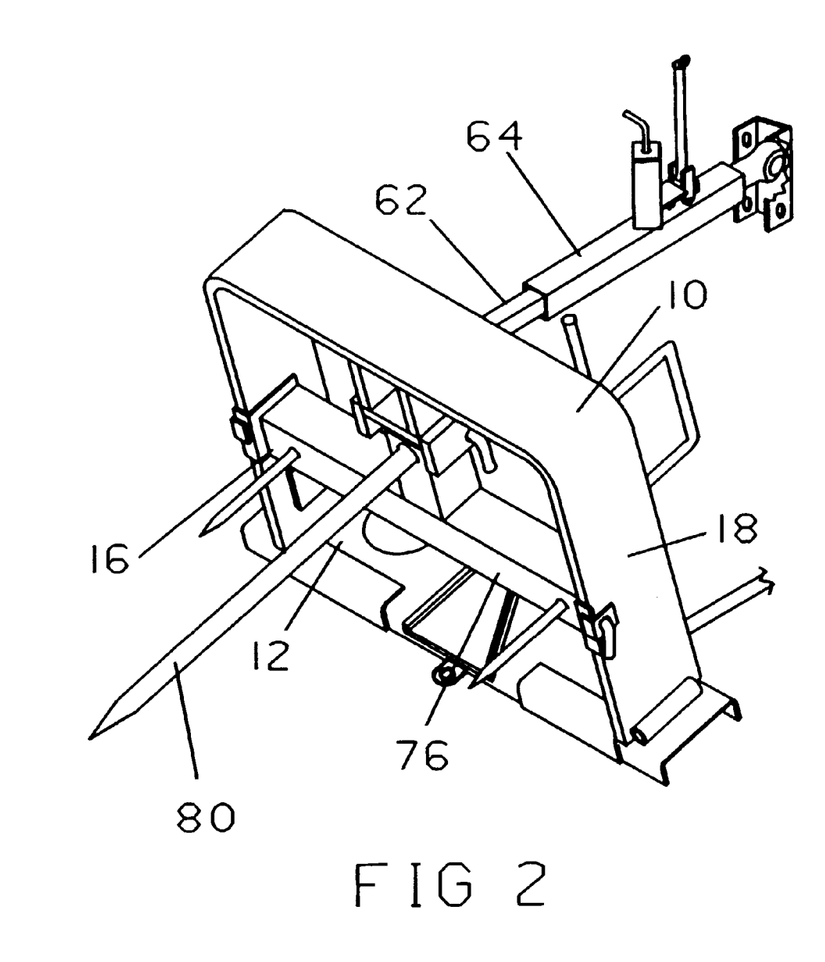
FIG. 2 is a view similar to FIG. 1 showing the mounting frame in a tilted position.

The two telescoping members 62 and 64 are shiftable between a retracted and an extended position. The retracted position is shown in FIG. 1 and the extended position is shown in FIG. 2. Telescoping members 62 and 64 are held in the retracted and extended positions by a retractable pin 70 that extends through holes in both members 62 and 64 that are aligned in the retracted and extended positions. The retractable pin 70 is biased by a coil spring 72 extending around the pin 70. This spring 72 normally biases the pin 70 downward in the position shown in FIG. 3. An actuating lever 74 mounted on the outer retractable member 64 is used to shift the pin 70 to a retractable position. The lever 74 is attached to the pin 70 by a horizontal section 75 the forms the bottom stop for the spring 72. As long as the spring is in an extended position forcing the stop 75 downward, the pin 70 will extend through aligned holes in the two telescoping members 62 and 64. However, when the lever is actuated by rotating it in the clockwise direction as seen in FIG. 3, the spring 72 is compressed and the pin 70 is shifted upwardly frecing the inner telescoping member 62 form the outer telescoping member 64. The inner telescoping member 62 has a second hole that will be aligned with a hole in the outer telescoping 64 when the two members are in the extended position. The operator can then release the actuating lever 74 to permit the pin to drop through both holes to hold the telescoping arm 60 in the extended position. The actuating lever 74 is manually activated in the preferred embodiment by an operator from a tractor seat. Of course the pin could be released by a remotely controlled motor or by a hydraulic actuator or other equivalent mechanical means that would be apparent to one of ordinary skill in the art. As can be seen by comparing FIGS. 1 and 2, one of the principal functions of the telescoping arm 60 is to permit the mounting frame 10 to be quickly and easily tilted, which can be advantageous for dumping loads or other operations.

Figure 7:
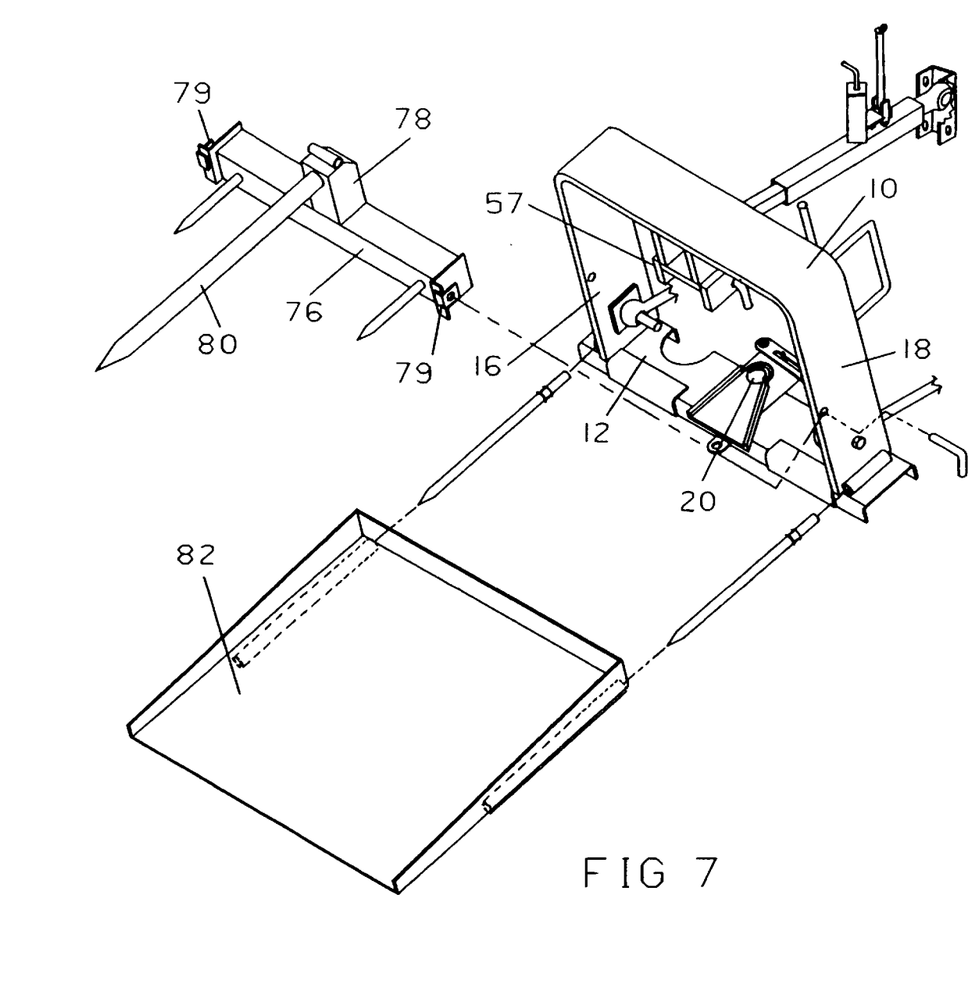
FIG. 7 is a view of the maimer in which a bucket or pan, used for lifting and dumping a load, is attached to the mounting frame, and the manner in which a center beam attachment that is mounted on the frame to carry loads such as hay.

The mounting frame 10, the ball socket 20 and the telescoping arm 60 provide means for employing a number of implements with a vehicle, especially for hauling, towing, power delivery to a towed implement and for dumping. However, the mounting frame 10 is not limited to these applications. The peripheral mounting frame 10 provides a means for supporting additional equipment. One such application is shown in FIG. 7 in which a center beam attachment subassembly is mounted on the rectangular frame 10. This center beam subasssembly comprises a horizontal bar or beam 76 extending between the two upright supports or side rails 16 and 18 and between and parallel to the bottom beam 12 and the top beam 14. The center beam 76 is pinned to each of the side rails 16, 18 by means of L-shaped braces 79 at each end of the beam 76. Pins are inserted through these braces and through holes in the sides 16, 18 located at the prescribed height. The center beam subassembly also includes a center post 78 extending above the beam 76. The top of center post 78 is pinned to the flanges 57 on the bottom of top link attachment bracket 56. The center beam subassembly is therefore secured to the mounting frame 10 at three points. Accessory equipment such as bailing rods 80, used to support and transport round hay bails can then be attached to the center beam subassembly and supported on the mounting frame 10.

Figure 10:
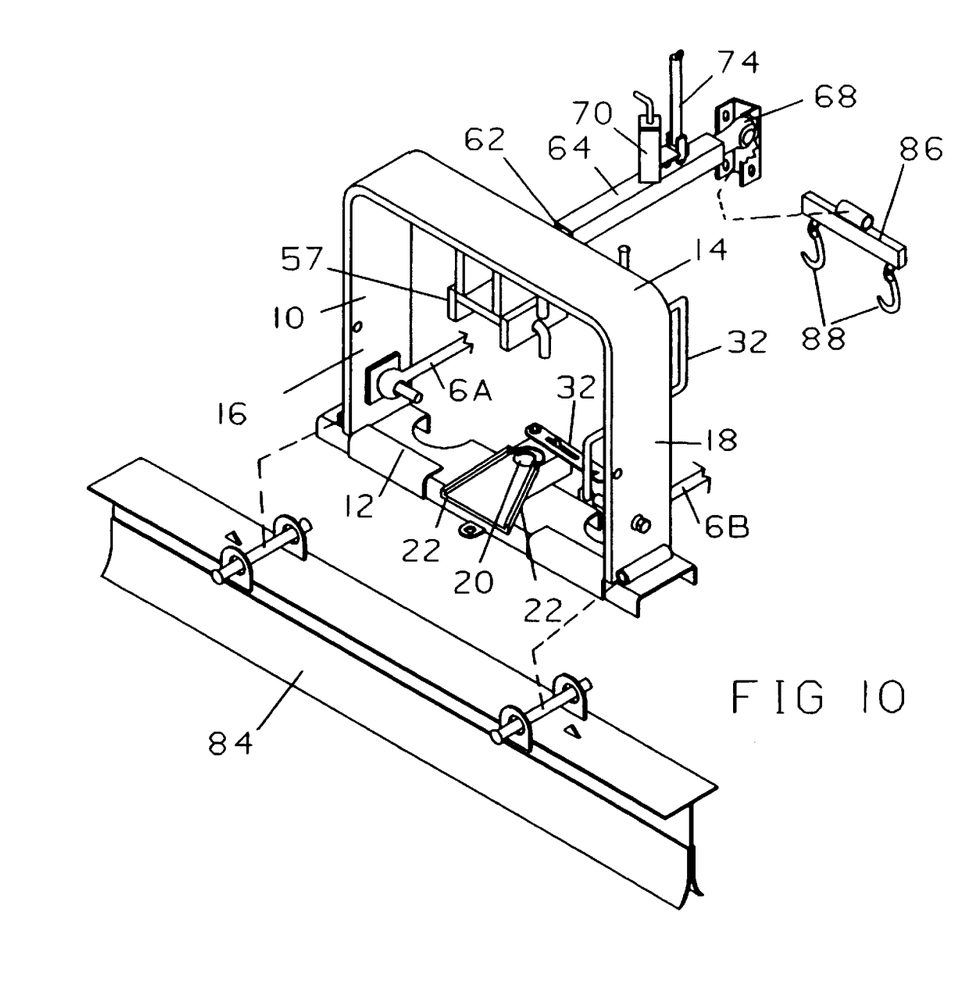
FIG. 10 is another view of the embodiment of FIG. 1 showing a scraper blade attachment that can be mounted to a frame and hooks to which chains can be attached to independently support the frame at a given height.

Other implements can be mounted to the lower horizontal beam 12. For example rods extending from the lower beam 12 can be used to mount a bucket or pan for transporting and dumping dirt or debris. When a pan 82, such as that shown in FIG. 7, is mounted on the rods extending from the lower beam 12, the pan 82 can be lifted by the tractor's three point hitch and when it is necessary to dump the dirt or debris in the bucket or pan, the telescoping arm 60 is released by retraction of pin 70, thus causing the mounting frame 10 along with the attached pan 82 to tilt rapidly from the position shown in FIG. 1 to that shown in FIG. 2. The contents of the pan 82 can thus be dumped at virtually any desired location. By using rods extending through tubular mounting brackets of the pan 82, the bucket or slide can be easily removed from the tractor by simply extracting the rods by horizontal movement. The same rods can be inserted into tubular mounting brackets simply by backing the tractor into position. FIG. 10 shows that a scrapper blade 84 can also be mounted to the base of the frame using pins that can be inserted into tubular mounting brackets on the frame 10. FIG. 10 also shows a support bracket 86 that can be mounted to a fixed point on the tractor, separate from the three point hitch. Hooks 88 are mounted on the support bracket 86. Chains, not shown, can be attached to these hooks and to the base 12 or some other point on the frame 10. These chains can then be used to support the frame 10 independently of the three point hitch and to maintain the frame 10 at a minimum height. Supporting the frame 10 in this manner independently of the three point hitch can be of use when the a the power take off is used. The chains would prevent the frame from dropping inadvertently so that no damage would be done to the power take off because clearance would be maintained between the power take off and the frame 10.

Figure 6:
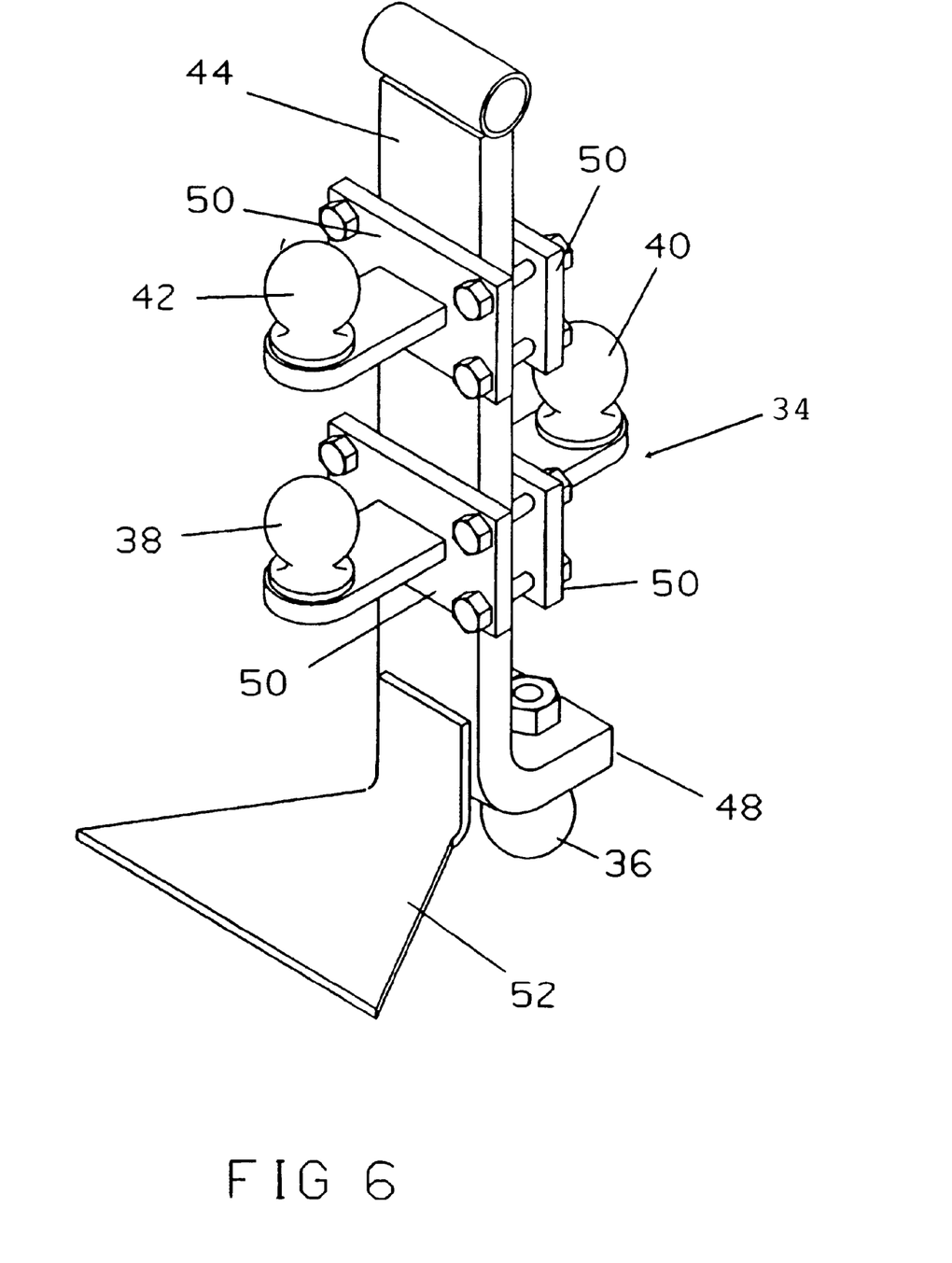
FIG. 6 is a view of a ball adaptor that is used with the ball socket shown in FIG. 4 to attach an implement with a female mounting attachment to the mounting frame.

Another adaptor that can be mounted in the middle of the rectangular frame 10 is shown in FIG. 6. One obvious limitation of the female socket 20 located at the bottom of the rectangular frame is that the implement to be attached to the mounting frame 10 must have a male attachment such as a standard hitching ball. Some implements, such as gooseneck trailers typically have female attachment members, such as ball sockets or rings in which a mounting ball on a tractor or truck is to be mounted. The multiball adaptor 34 shown in FIG. 6 provides a means for attaching an implement with a female mounting attachment to the ball socket 20 on the mounting frame 10. The ball adaptor 34 has a first ball 36 that is the appropriate size to fit within the ball socket 20. This ball 36 faces downward. Three other balls 38, 40, and 42 each face upward or in the opposite direction from the first ball 36. These other balls 38, 40, 42 can also be of differing sizes to facilitate attachment of various implements to the ball adaptor 34. The four balls 36, 38, 40, 42 are mounted on an L-shaped flange 44. The first ball 36 is permanently mounted to the horizontal base 48 of the flange 44. The other three balls 38, 40, 42 are mounted on plates 50 that can be bolted to the vertical section of flange 44. These plates 50 and the balls attached thereto can therefore be repositioned on the flange 44 as required. Two of the balls 38 and 40 are located on opposite sides of the flange 44. Of course only the rearwardly facing ball 38 could be used to attach an implement to the ball adaptor 34 in this position. However the two flanges 50 can be unbolted and the position of the two balls 38, 40 could be reversed when a ball of that size is needed.

The ball adaptor 34 is mounted on the mounting frame 10 by attaching the top and bottom of the adaptor to the frame. Of course the ball 36 is mounted in the ball socket 20. A foot 52 protrudes from the L-shaped flange adjacent the bend between the vertical section 46 and the horizontal section 48. This foot 52 is dimensioned to engage the sloping surface 24 to the rear of the ball socket 20. The flange 44 also includes a cylindrical mounting member or tube 54 at the top of the vertical section 46. This cylindrical mounting member fits between the two flanges 57 at the base of the rectangular bracket 56. A pin 58 is then used to secure the top of the adaptor 34 to the mounting frame 10.

An alternative means for attaching a towed implement having a ball that is smaller than the ball socket 20 is to insert one or more rings into the ball socket to decrease the inner diameter of the ball socket 20. The width of the fork 26 is chosen so that it can be used with all practical ball attachment members currently in use.

An implement, such as a trailer, a combine or other farm equipment can be easily attached either directly to the ball socket 20 or to the mounting frame 10 through the ball adaptor 34. The three point hitch attachment of the mounting frame 10 to a tractor allows the mounting frame to be shifted vertically. Therefore the mounting frame 10 can be lowered sufficiently to allow the mounting, apparatus, either ball socket 20 or the appropriate ball on adaptor 34, to be lowered to a height at which it can be moved beneath the mounting attachment on the towed implement and the tractor can be backed until the two attachment means are generally in alignment. Of course, if the ball socket 20 is used for attachment to a ball on the towed implement, the tractor can be backed until the ball rests upon sloping surface 24 after which the towed vehicle ball can be guided into alignment with the ball socket 20. If necessary, the mounting frame 10 can be lifted until the attachment means on the two vehicles are engaged. To permit a ball to enter into the ball socket 20, the fork 26 is first retracted and then returned to the extended position to lock the ball in place. In any event, the entire attachment operation can be completed by one operator who does not have to leave the tractor during the attachment operation. Detachment of the two vehicles merely requires reversal of these steps and again the operator can perform the entire operation without leaving the tractor.

Accessory implements such as the ball adaptor 34 and the center beam subassembly can be mounted on the frame 10 by a single operator. The only steps necessary for mounting either of these two subassemblies is alignment of mounting holes on the mated pieces of equipment and the insertion of pins through these aligned holes. Both the ball adaptor 34 and the center beam subassembly use the same mounting flanges near the top center of the rectangular frame 10. Other pieces of equipment, such as the pan or bucket 82 merely require the operator to attach rods at appropriate points on the mounting frame 10 and then to back the tractor until these rods are received within mounting means on the equipment. This approach is also adaptable to other accessory equipment such as grading equipment that can be attached to bars extending from the bottom beam 12.

Figure 8:
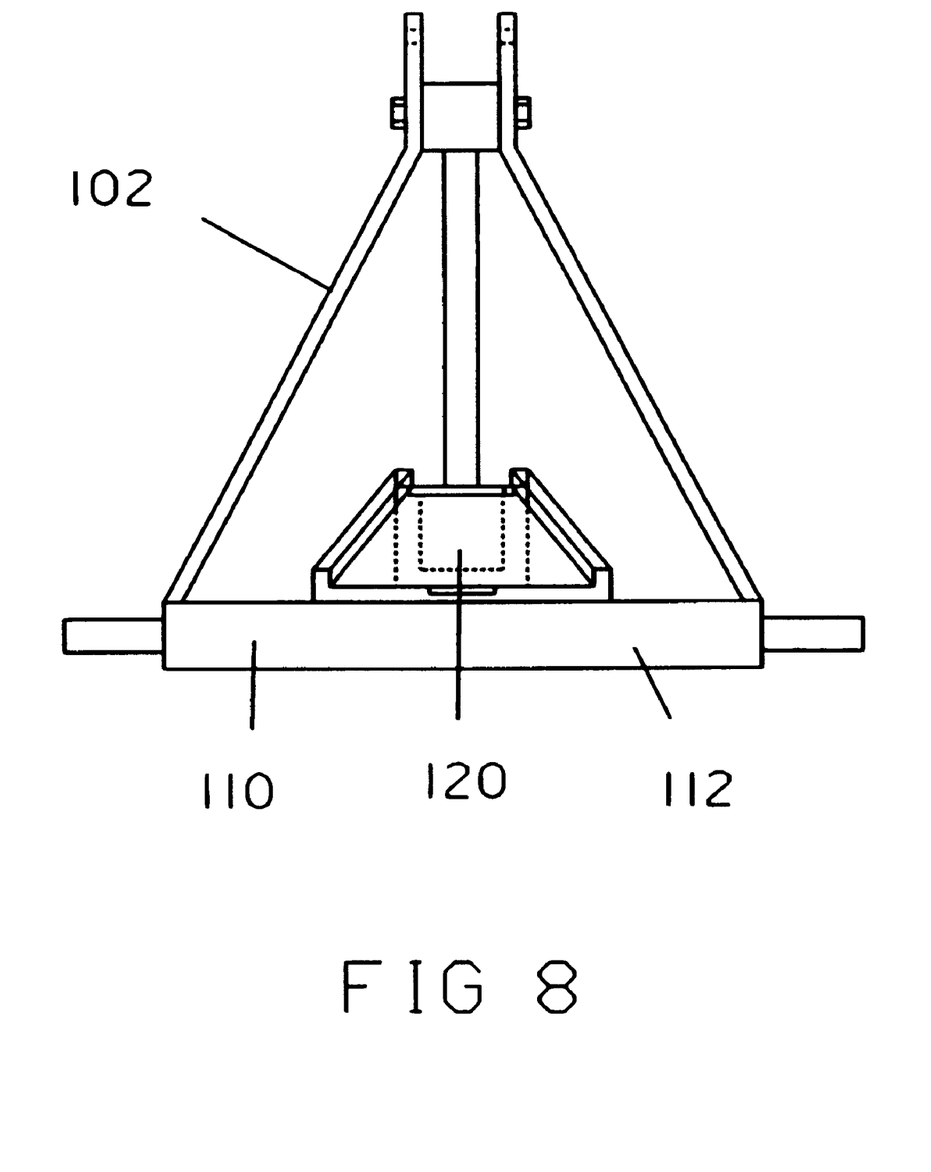
FIG. 8 is a rear view of a first alternate embodiment of the ball socket attachment member.

An alternate embodiment of a mounting apparatus 102 according to the broader aspects of this invention is shown in FIG. 8. The mounting frame 110 of this alternate embodiment includes a lower horizontal bar or beam 112 with a ball socket 120 located at the center of the beam 112. Ball socket 120 functions in the same manner as ball socket 20 of the preferred embodiment. The alternate embodiment also includes an attachment point, located above the socket 120 that can be connected to a telescoping arm 60 in the same fashion as for the preferred embodiment. The embodiment of FIG. 7 does not, however, provide sufficient open space in the middle of frame 110 to provide access for power takeoff, and this embodiment does not provide for attachment of auxiliary apparatus, such as the center bar subassembly for supporting loads without the use of a towed implement. This alternate embodiment, does however, demonstrate that equivalent structures can be employed to implement various aspects of this invention.

Figure 9:
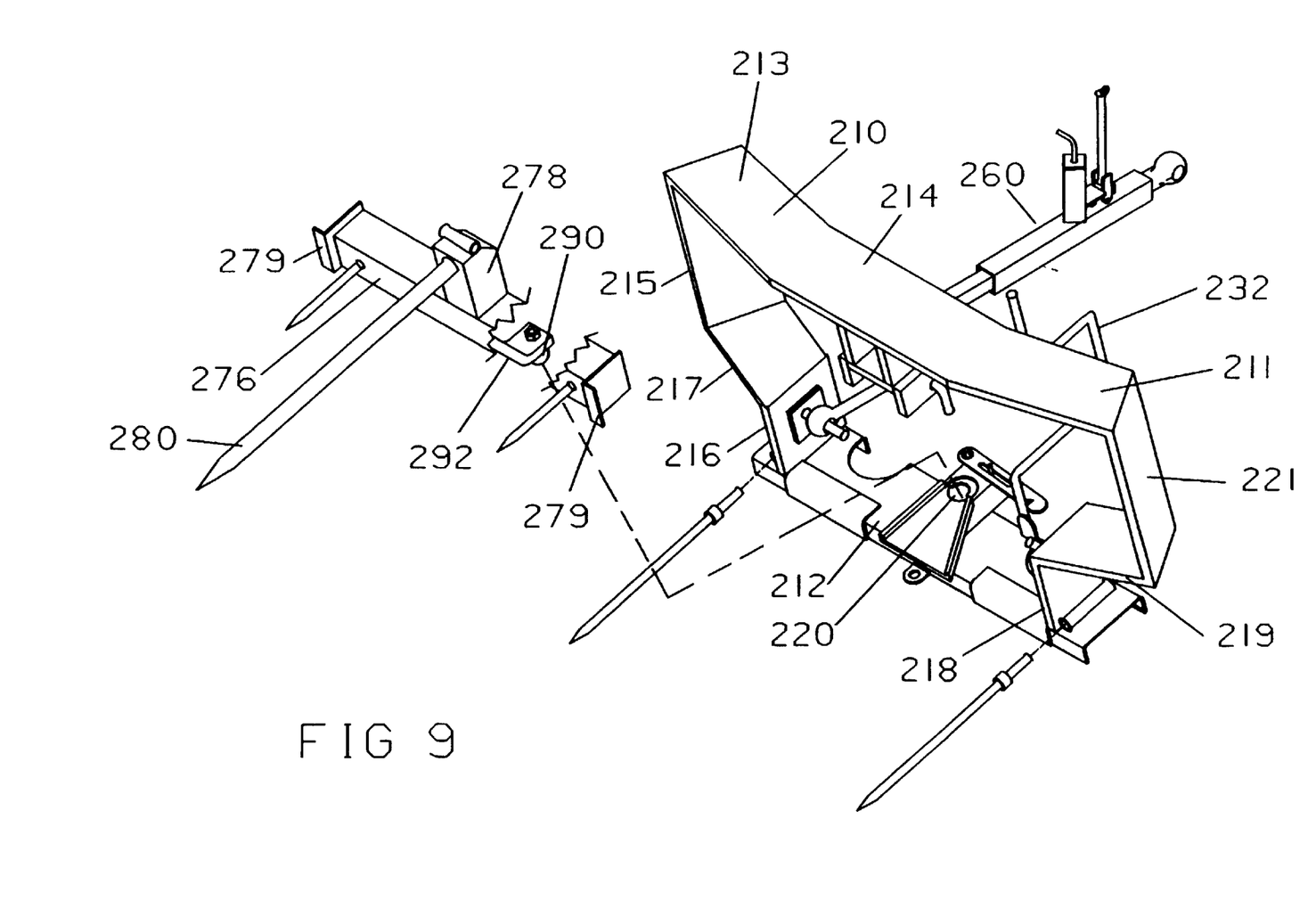
FIG. 9 is a view of a second alternate embodiment in which the peripheral frame includes offset side rails to allow a tighter turning when used with a towed implement.

A third embodiment of this invention is shown in FIG. 9. This third embodiment permits tighter turning radius when used with a towed vehicle or equipment because the sides of the frame 210 are recessed to provide additional clearance for a towing bar. The frame 210 has an open center, but the sides of the frame are partially offset and partially recessed relative to the lower horizontal beam or bar 212 on which a ball socket 220 is mounted in the same manner as in the embodiment of FIG. 1. Each of the sides includes three sections. The lower sections 216, 218 extend upward adjacent the opposite ends of the lower bar 212. Central sections 217 and 219 extend outwardly from sections 216 and 218 to points laterally beyond the ends of the lower horizontal bar 212 and beyond the links 6A and 6B (not exposed in FIG. 9) of a conventional three point hitch. These laterally extending sections 217 and 219 also extend back toward the tractor or other vehicle on which the frame 210 is attached. By extending and recessing the sides of the frame 210 in this manner, a tow bar on an attached vehicle can rotate through a larger angle, thereby permitting a tighter turning radius. Upper side sections 215 and 221 extend upwardly from the middle sections 217, 219 to the top of the frame 210. It is these upper sections that are recessed and laterally offset relative to the links 6A and 6B. The top beam of frame 210 is divided into three sections. The two end sections 211 and 213 extend inwardly from the top side sections 215 and 221 where they are joined to a central section 214 which is located above the middle of the lower beam 212 in the same relationship as the upper and lower beams in the embodiment of FIG. 1. The individual sections of the sides and top of the frame 210 can be welded to the adjoining sections. The center of the frame 210 is open and has a generally T-shaped configuration instead of the rectangular section of the frame 10.

A telescoping arm 260, of the same construction as telescoping arm 60, is hinged or pivoted relative to the central section 214 in the same manner as in the embodiment of FIG. 1. The telescoping arm 260 is shown in the extended position in FIG. 9 and the frame 210 is tilted in the same manner as in FIG. 2. Since the center top beam section 214 is located directly above the lower beam 212 in the same basic relationship with respect to the attachment points of links 6A and 6B, the frame 210 can still be pivoted in the same manner as the frame 10 shown in FIGS. 1 and 2.

Implements, Such as a central beam 276 for supporting a bailing rod 280, can be attached to the frame 210 in much the same manner as center beam 76 can be attached to the frame 10 as shown in FIG. 7. The center bar 276 includes a center post 278 which extend upwardly from the beam 276 and includes attachment means for securing the top of the center post to the bottom of the middle section 214. The center bar 276 is mounted on the frame 210 above the attachment points for links 6A and 6B. The end flanges 279 on the center beam are supported by the laterally narrow side sections 216 and 218 above the link attachment points. A bail rod 280 is located on the center post 278 above link attachment points where it can pivot. The center beam 276 is also attached to the ball socket 220 by a ball 290 which is attached to the center beam 276 by a flange 292.

Equivalent structural components can be substituted for the representative structures disclosed herein. For example, each of the frames depicted herein is formed by flat sections that are either mutually bent relative to adjoining sections or are welded to adjoining sections. An alternative approach would be to use tubular members to form the frame sections. It should also be understood that the attached implements and equipment which are shown herein are also intended to be representative and not exclusive of all of the implements and equipment that can be mounted on this frame. The embodiments depicted herein are therefore only representative of numerous embodiments including equivalent structures that would be apparent to one of ordinary skill in the art and this invention is defined by the following claims and not by these representative embodiments.

I claim:

1. An implement attachment apparatus for use with a three point hitch comprising:
   a frame attachable to the three point hitch and shiftable by the three point hitch, the frame including a horizontal bar attachable at opposite ends to the three point hitch, and a central attachment point located above the horizontal bar; and
   an implement attachment socket located on the horizontal bar and below the central attachment point, the frame being movable vertically in response to movement of the three point hitch so that the implement attachment socket can be positioned beneath an attachment member on a implement and so that the attachment member can be disengaged from the implement attachment socket by movement of the three point hitch and the frame and socket attached thereto.

2. The implement attachment apparatus of claim 1 wherein the implement attachment socket comprises a ball socket.

3. The implement attachment apparatus of claim 2 wherein converging guide rails are mounted above the horizontal bar on opposite sides of the ball socket so that a ball on an implement will be guided into alignment with the ball socket as the implement is attached to the three point hitch.

4. The implement attachment apparatus of claim 2 wherein a sloping surface extends rearwardly from the ball socket so that a ball on an implement will ride on the sloping surface prior to dropping into the ball socket.

5. The implement attachment apparatus of claim 4 wherein converging guide rails are located on opposite sides of the sloping surface to guide a ball on an implement into the ball socket.

6. The implement attachment apparatus of claim 2 wherein the implement attachment socket includes a fork shiftable transversely relative to the horizontal bar over a ball located in the ball socket to secure the ball in the ball socket.

7. The implement attachment apparatus of claim 6 wherein the fork is spring loaded and is shiftable between an extended ball engaging position and a retracted position by a lever extending above the horizontal bar.

8. The implement attachment apparatus of claim 2 further comprising a ball adaptor, mountable on the frame and socket, and including first and second balls, the first ball extending downward and positioned within the ball socket and the second ball, located to the rear of the first ball, extending upward for engagement with and disengagement from a female attachment member on the implement.

9. The implement attachment apparatus of claim 8 wherein the first and second balls are mounted on transversely extending sections of an L-shaped member, the ball adaptor including a foot extending from the L-shaped member and engaging a surface adjacent the ball socket to support the ball adaptor in an upright position.

10. The implement attachment apparatus of claim 8 wherein the ball adaptor is attachable to the top of the frame.

11. An implement attachment apparatus for use in selectively attaching wheeled implements to a powered vehicle in order to transport the wheeled implements and for mounting work implements on the rear of the powered vehicle, the implement attachment apparatus being adapted to be attached to the powered vehicle; the implement attachment apparatus comprising:
   a frame comprising a lower beam and an upper beam, substantially parallel to the lower beam;
   first and second upright supports extending between the upper and lower beams, the first and second upright supports being spaced apart so that the frame is open between the upper and lower beams, wherein an opening is formed between the upper and lower beams, to provide lateral clearance for power takeoff members extending between the powered vehicle and attached implement so that the powered vehicle can turn relative to the attached implement without interference with the power takeoff;
   a pivoting attachment member attached to the upper beam; and
   second and third pivoting attachment points adjacent ends of the lower beam, wherein the pivoting attachment member and the second and third pivoting attachment points comprise means for attaching the frame to the powered vehicle so that the frame can be pivoted relative to the powered vehicle for performing work and for attaching or detaching an implement to the powered vehicle.

12. The implement attachment apparatus of claim 11 wherein the frame is pivoted about a horizontal axis extending parallel to the upper and lower beams.

13. The implement attachment apparatus of claim 11 including a detachable center beam extending between the upright supports with a central post extending between the center beam and the pivoting attachment member and detachably connected thereto.

14. The implement attachment apparatus of claim 11 wherein a telescoping arm extends from the powered vehicle to the pivoting attachment member for attachment thereto, the telescoping arm comprising a first telescoping member releasable relative to a second telescoping member to permit the frame to tilt rapidly in response to extension of the telescoping arm.

15. The implement attachment apparatus of claim 11 including an implement attachment socket mounted on the center of the lower beam so that an implement can be attached to the center of the frame.

16. An apparatus for selectively attaching implements to a tractor at three points, the apparatus comprising:

a peripheral frame having a base and a top and including hinge pins for attaching the frame to the tractor adjacent opposite ends of the base of the frame and at the top of the frame at a central location on the top, the peripheral frame being open in the center to provide clearance for a power takeoff from the tractor;

a telescoping arm adapted to extend between the center of the top of the frame and the tractor, the telescoping arm including telescoping members that are releasable to permit the frame to tilt relative to the base upon release of one telescoping member relative to the other telescoping member; and an implement attachment member located on the base of the frame for attaching an implement to the frame.

17. The apparatus of claim 16 wherein side rails of the peripheral frame each include attachment points for mounting a center beam on the frame.

18. The apparatus of claim 17 wherein the center beam is also attachable to the top of the frame adjacent the hinge pin on the top of the frame.

19. The apparatus of claim 16 wherein the implement attachment member comprises a female attachment member.

20. The apparatus of claim 19 wherein the female attachment member comprises a ball socket.

21. The apparatus of claim 20 wherein a ball attachment member having oppositely disposed balls is mounted with one ball in the ball socket and a second ball facing rearwardly relative to the frame for attaching an implement to the tractor.

22. The apparatus of claim 16 wherein the frame includes offset side sections which form a T-shaped central opening in the frame.

23. A apparatus for selectively attaching a plurality of alternative farm implements to a tractor, comprising a frame attachable to bottom links of a three point hitch on the tractor and a telescoping arm comprising a central link of the three point hitch and attachable to the center of the frame above and between the bottom links, the frame including an implement attachment socket on the bottom of the frame between the bottom links, the height of the frame being altered by movement of the three point hitch and the frame being tiltable from a vertical upright position upon extension of the telescoping arm in the absence of any other movement of the three point hitch.

24. The apparatus of claim 23 wherein the frame includes mounting members for rods extending rearwardly from the frame so that a bucket can be attached to the frame by the rods the bucket being movable between a lower and an upper position by movement of the three point hitch and being tilted by release of the telescoping arm so that contents of the bucket can be dumped.

25. An implement attachment apparatus for use with a three point hitch comprising:

a frame attachable to the three point hitch and shiftable by the three point hitch, the frame including a horizontal bar attachable at opposite ends to the three point hitch, and a central attachment point located above the horizontal bar;

an implement attachment socket located on the horizontal bar and below the central attachment point, the frame being movable vertically in response to movement of the three point hitch so that the implement attachment socket can be positioned beneath an attachment member on a implement; and a locking member mounted on the horizontal bar for locking the attachment member in and releasing the attachment member from the implement attachment socket so that an implement can be attached to a tractor and released from the tractor by a tractor operator without dismounting from the tractor.

\* \* \* \* \*